United States Patent
Vuong et al.

(10) Patent No.: US 8,253,705 B2
(45) Date of Patent: Aug. 28, 2012

(54) TARGET ZONES FOR MENU ITEMS ON A TOUCH-SENSITIVE DISPLAY

(75) Inventors: Thanh V. Vuong, Waterloo (CA); Jason Griffin, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 633 days.

(21) Appl. No.: 12/463,006

(22) Filed: May 8, 2009

(65) Prior Publication Data
US 2010/0283746 A1 Nov. 11, 2010

(51) Int. Cl.
G06F 3/041 (2006.01)
G06F 3/048 (2006.01)

(52) U.S. Cl. ......................................... 345/173; 715/841

(58) Field of Classification Search .......... 345/173–183; 715/702, 804, 841
See application file for complete search history.

(56) References Cited

U.S. PATENT DOCUMENTS

| | | | |
|---|---|---|---|
| 5,877,751 A | 3/1999 | Kanemitsu et al. | |
| 2006/0158426 A1 | 7/2006 | Hagiwara | |
| 2007/0250786 A1 | 10/2007 | Jeon et al. | |
| 2007/0287505 A1 | 12/2007 | Shin et al. | |
| 2008/0074399 A1 | 3/2008 | Lee | |
| 2008/0115060 A1 | 5/2008 | Mosko | |
| 2008/0172633 A1 | 7/2008 | Jeon et al. | |
| 2008/0178118 A1 | 7/2008 | Ishii et al. | |
| 2009/0249203 A1* | 10/2009 | Tsuruta et al. | 715/702 |

FOREIGN PATENT DOCUMENTS

| | | |
|---|---|---|
| EP | 1847915 A2 | 10/2007 |
| JP | 11143673 | 5/1999 |
| JP | 11288426 | 10/1999 |
| JP | 2000314636 | 11/2000 |
| JP | 2004086733 | 3/2004 |
| JP | 2006085458 | 3/2006 |
| JP | 2006195768 | 7/2006 |
| JP | 2007145106 | 6/2007 |
| JP | 2008090376 | 4/2008 |
| JP | 2010528374 | 8/2010 |
| KR | 20070113024 | 11/2007 |
| WO | 2007032843 A2 | 3/2007 |
| WO | 2008010432 | 1/2008 |
| WO | 2008144731 | 11/2008 |

OTHER PUBLICATIONS

European Patent Office, "Communication pursuant to Article 94(3) EPC—Examination Report," issued in connection with International Application No. 09 159 752.6, mailed on Sep. 9, 2010 (6 pages).

European Patent Office, "Extended European Search Report," issued in connection with International Application No. 09 159 752.6, mailed on Oct. 9, 2009 (6 pages).

(Continued)

*Primary Examiner* — Kevin M Nguyen
(74) *Attorney, Agent, or Firm* — Hanley, Flight & Zimmerman, LLC

(57) ABSTRACT

A portable electronic device is disclosed that includes a user interface with improved menu or list controls. Each of the items of the menu or list include a target zone that is spatially arranged in such a manner as to differentiate the menu items from one another and provide an easy target for contact by a user.

20 Claims, 3 Drawing Sheets

OTHER PUBLICATIONS

Korean Intellectual Property Office, Office Action issued in KR application 10-2010-0042626, including English translation, dated Aug. 20, 2011, 6 pages.
Japanese Patent Office, office action issued in JP Patent Application 2010-090937, dated Oct. 4, 2011, 2 pages of Japanese text and 3 pages of English translation of the same.
European Search Report for EP09159752 dated Oct. 5, 2009 [2 pages].
Korean Intellectual Property Office, Office Action issued in KR application 10-2010-0042626, including English translation, dated Mar. 27, 2012, 13 pages.
State Intellectual Property Office of People's Republic of China, Office Action issued in CN application 201010174043.3, including English translation, dated Feb. 29, 2012, 18 pages.

* cited by examiner

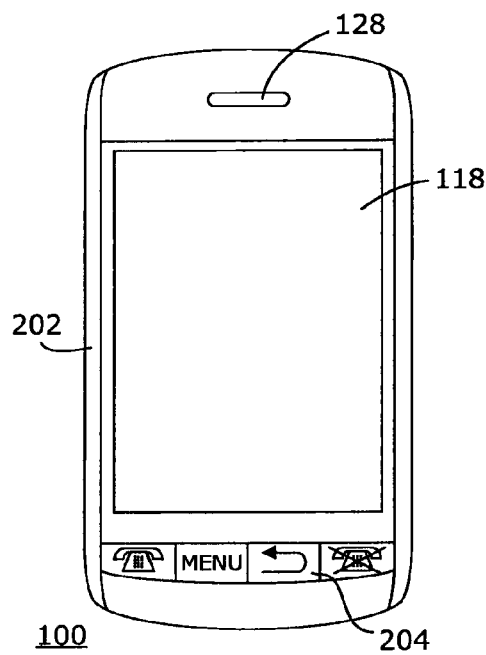
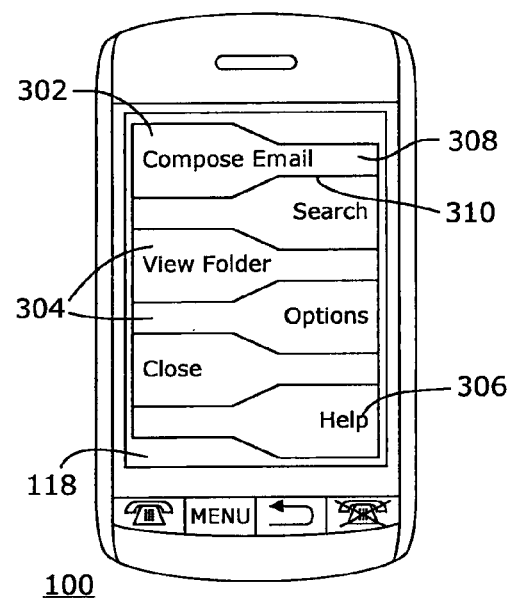
FIG. 2
FIG. 3
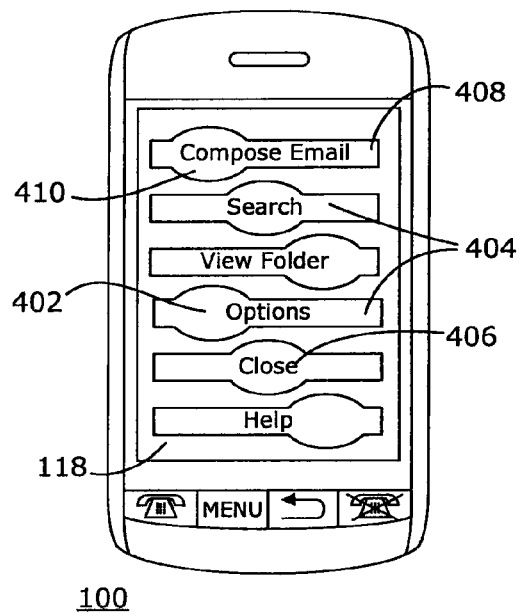
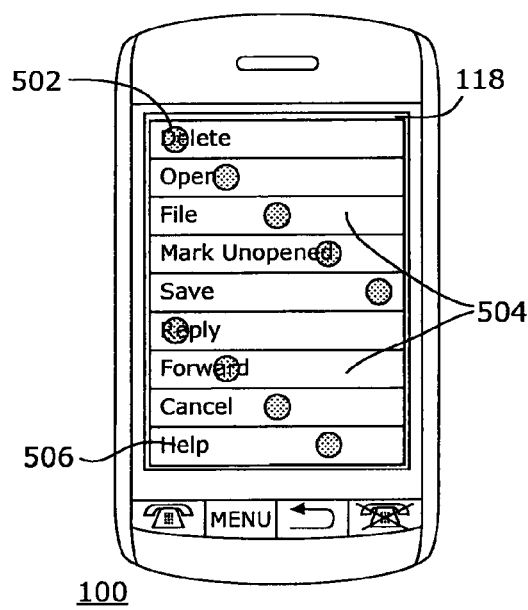
FIG. 4
FIG. 5

TARGET ZONES FOR MENU ITEMS ON A TOUCH-SENSITIVE DISPLAY

FIELD OF TECHNOLOGY

The present disclosure relates to portable electronic devices, including but not limited to portable electronic devices having touch screen displays and their control.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart telephones, wireless personal digital assistants (PDAs), and laptop computers with wireless 802.11 or Bluetooth capabilities. These devices run on a wide variety of networks from data-only networks such as Mobitex® and DataTAC® networks to complex voice and data networks such as GSM/GPRS, CDMA, EDGE, UMTS and CDMA2000 networks.

Portable electronic devices such as PDAs or smart telephones are generally intended for handheld use and ease of portability. Smaller devices are generally desirable for portability. A touch screen display for input and output is particularly useful on such handheld devices, as such handheld devices are small and are therefore limited in space available for user input and output devices. Further, the screen content on the touch screen display devices may be modified depending on the functions and operations being performed. Even still, these devices have a limited area for rendering content on the touch screen display and for rendering features or icons, for example, for user interaction. With continued demand for decreased size of portable electronic devices, touch screen displays continue to decrease in size.

Improvements in touch screen devices are therefore desirable.

BRIEF DESCRIPTION OF THE DRAWINGS

FIG. 2 is a front view of the portable electronic device having a touch-sensitive display in accordance with the disclosure.

FIG. 3 illustrates menu items having target zones with wide areas on alternating left and right sides on a touch-sensitive display in accordance with the disclosure.

FIG. 4 illustrates menu items having enlarged target zones on a touch-sensitive display in accordance with the disclosure.

FIG. 5, FIG. 6, and FIG. 7 illustrate menu items having shaded target zones on a touch-sensitive display in accordance with the disclosure.

DETAILED DESCRIPTION

Figure 1:
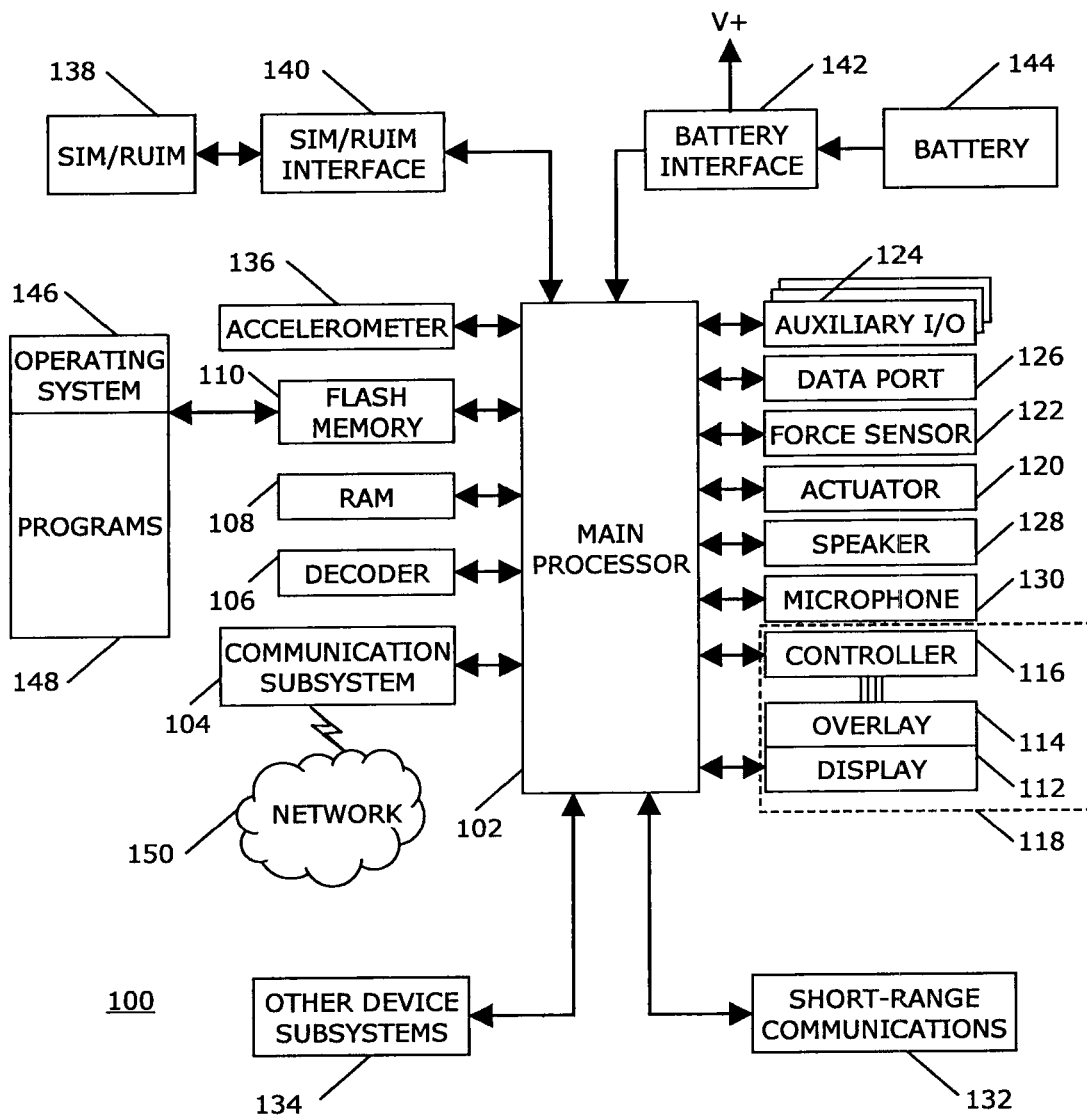
FIG. 1 is a block diagram of a portable electronic device in accordance with the disclosure.

The following describes a method of and apparatus for displaying target zones for menu items on a touch-sensitive display. Various methods of displaying target zones in conjunction with the menu items are disclosed. Target zones may be distributed in numerous different positions along the menu items and may be represented within enlarged areas of the menu items. A selection area for a menu item may extend beyond the area displayed for the menu item.

A plurality of menu items are displayed on a touch-sensitive display. The plurality of menu items correspond to a plurality of target zones. The display of the plurality of menu items includes representations of a target zone distributed among at least three different positions along the menu items. A touch is detected within a first target zone associated with a first menu item. At least one function associated with selection of the first menu item is performed.

At least two adjacent menu items may have a common border.

The first target zone may include an enlarged area of the first menu item. The first menu item may further include a supplemental zone that is shorter in at least one dimension than the first target zone, such that detecting a touch within the supplemental zone selects the first menu item. The supplemental zone and the first target zone may be displayed in a single area associated with the first menu item.

The displayed area for each of the plurality of menu items may include a first end and a second end. At least some of the plurality of target zones may be located away from the first end and the second end.

At least a part of an identifier for the first menu item may be located within the first target zone.

The plurality of menu items may be listed in a first direction, and the plurality of target zones may be arranged along a second direction that is substantially perpendicular to the first direction. The plurality of target zones may be arranged in a repeating pattern. The plurality of target zones may extend along a diagonal direction relative to the first direction. The plurality of target zones may be distributed along at least five different positions along the second direction.

The first menu item may be displayed in a first color arrangement and the first target zone may be displayed in a different color arrangement.

The first target zone may be visually depicted entirely within a displayed area of the first menu item. A selection area for the first menu item may extend beyond the displayed area of the first menu item.

Performing at least one function may include displaying information associated with selection of the first menu item.

A computer readable medium may include stored instructions executed by a processor of a portable electronic device and causing the portable electronic device to implement any of the methods described herein.

A portable electronic device includes a touch-sensitive display and a microprocessor. The touch-sensitive display is configured to display a plurality of menu items. The microprocessor is configured to detect a touch within a selection area of a first menu item of the plurality of menu items in which the selection area extends beyond an area displayed for the first menu item. The microprocessor is further configured to perform at least one function associated with selection of the first menu item.

The selection area of the first menu item may overlap an area displayed for a second menu item.

The touch may be imparted on the touch-sensitive display with a force that exceeds a predetermined threshold.

The function performed may include displaying information associated with selection of the first menu item.

A portable electronic device is also disclosed that includes a touch-sensitive display and a microprocessor. The touch-sensitive display is configured to display a plurality of menu items in which a target zone is displayed within an area displayed for a first menu item of the plurality of menu items. The microprocessor is configured to detect a touch within a selection area of the first menu item in which the selection area extends beyond the area displayed for the first menu item. The microprocessor is further configured to perform at least one function associated with selection of the first menu item. The selection area overlaps an area displayed for a second menu item. At least two adjacent menu items have a common border.

The disclosed method and portable electronic device display menu items, or lists, with improved usability. Due to the relatively small size of touch-sensitive displays, the content displayed is often quite small and may be difficult to select. Because the fingers of a user may be large enough to cover more than one displayed item, it is easy for the user to easily select a nearby item rather than the intended item.

For simplicity and clarity of illustration, reference numerals may be repeated among the figures to indicate corresponding or analogous elements. In addition, numerous specific details are set forth in order to provide a thorough understanding of the embodiments described herein. The embodiments described herein may be practiced without these specific details. In other instances, well-known methods, procedures and components have not been described in detail so as not to obscure the embodiments described herein. Also, the description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of an embodiment of a portable electronic device 100 is shown in FIG. 1. The portable electronic device 100 includes a number of components such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together make up a touch-sensitive display 118 (also referred to in the art as a touch screen display), an actuator 120, a force sensor 122, an auxiliary input/output (I/O) subsystem 124, a data port 126, a speaker 128, a microphone 130, short-range communications 132 and other device subsystems 134. The processor 102 interacts with the touch-sensitive overlay 114 via the electronic controller 116. Information, such as text, characters, symbols, images, and other items that may be displayed on a portable electronic device, is displayed on the touch-sensitive display 118 via the processor 102. When a touch is detected on the touch-sensitive display 118, an X and Y coordinate of the touch is determined, as known in the art, and the location of the touch may be associated with information displayed via a graphical user interface. A touch may comprise one or more of various actions, including, but not limited to, one or more contacts, contact with respect to a pressure or other threshold, contact including movement, and various combinations thereof. The processor 102 may also interact with an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components 148 that are executed by the processor 102 and are typically stored in a persistent store such as the flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is substantially similar except that the received signals are output to the speaker 128 and signals for transmission are generated by the microphone 130.

A front view of the portable electronic device 100 is shown in FIG. 2. The portable electronic device 100 includes a housing 202 that supports the touch-sensitive display 118, a set of mechanical buttons 204, and the speaker 128.

A plurality of target zones 302 in wide areas are shown displayed with associated menu items 304 in FIG. 3. Each of the menu items 304 includes an identifier 306, such as a text label, symbol, icon, image or the like, within the area of the corresponding menu item 304. Each menu item is also shown having a target zone 302 in a wider area that is located on one side of the menu item 304, and a narrow area 308 that is noticeably thinner than the target zone 302 and located on the other side of the menu item 304.

The menu items 304 are arranged such that the target zones 302 are alternatively staggered on opposite ends of adjacent menu items. As shown in FIG. 3, the target zone 302 of the "Compose Email" menu item is on the left side of the touch-sensitive display 118, the target zone 302 of the "Search" menu item (immediately below the "Compose Email" menu item) is on the right, and the target zone 302 of the "View Folder" menu item (immediately below the "Search" menu item) is again on the left, and so on. The left-right staggering of the target zones 302 continues to the bottom of the list of menu items 304.

As utilized herein, a "target zone" refers to an area of a menu item that is in one or more ways visually identifiable as an area associated with the menu item. For instance, the target zones 302, 402, 502, 602, 702, 802, 902 of the embodiments described herein include enlarged areas, differently shaded areas, or colored areas. A target zone indicates an area, associated with the menu item, and having an increased likelihood of accurate selection.

Each of the menu items 304 illustrated in FIG. 3 has a shared or common border 310 with one or two adjacent menu items. This common border 310 maximizes the number of menu items 304 displayed on the touch-sensitive display 118 while providing a larger-size target zone 302 that increases the likelihood of accurate selection of an intended menu item 304. This layout efficiently uses the display space available on the touch-sensitive display 118. A common border also includes borders that are separate for each menu item, but the borders appear to touch or are so close that the space between borders is too small to be useable space.

Although not shown the drawings, each of the menu items 304 may be assigned a different color or a different color than its adjacent menu items to differentiate the various menu items 304 from one another.

Figure 8:
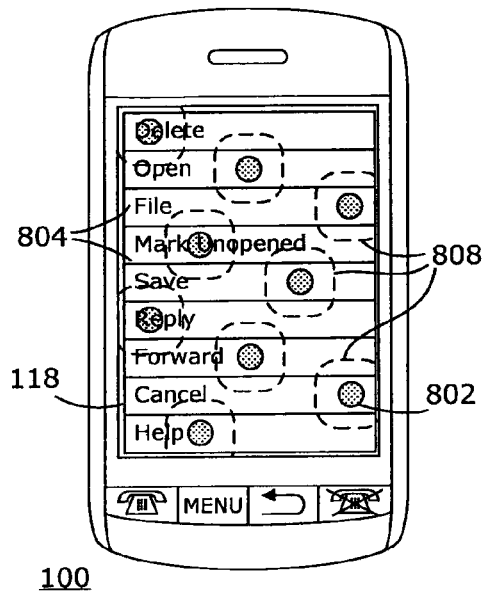
FIG. 8 illustrates shaded target zones with an enlarged selection area on a touch-sensitive display in accordance with the disclosure.

Each of the menu items 304 has an associated selection area. When a touch is detected within the selection area, the associated menu item is determined to be selected. The selection area may be the same as the area between the borders for the associated menu item, less than the area between the borders for the associated menu item (e.g., only a target zone), and/or may fall outside the borders for the associated menu item, such as shown in FIG. 8. When a touch is detected in a selection area associated with a menu item, the portable electronic device 100 performs at least one function associated with the selection of that menu item. This function may include displaying information associated with the selection of that menu item, launching an application, transmitting information, changing a setting of the portable electronic device 100, and/or any function known applicable to a portable electronic device 100.

For example, the selection area of each of the menu items 304 includes both the target zone 302 and the narrow area 308, or supplemental zone, making the entire area of the menu item 304 available for selection. In this example, the selection area and the area of the menu item 304 as displayed is the same. Alternatively, only the target zone 302 may be included in the selection area. Excluding the narrow areas 308 from the selection area is advantageous because the narrow areas 308 of the menu items 304 may be incidentally touched during an attempt to select one of the target zones 302 above or below the narrow area 308 and vise-versa. In contrast to lists having items that are uniformly long and narrow, the target zones 302 of the menu items 304 provide a larger, easily selectable, and clearly identifiable target for the corresponding menu item.

Enlarged target zones 402 associated with a plurality of menu items 404 are shown displayed in FIG. 4. Each of the plurality of menu items 404 includes an identifier 406, a narrow area 408 that is substantially rectangular, and a target zone 402 in an enlarged area that is bulbous in shape.

Similar to the embodiment of FIG. 3, the enlarged portion 410 serves as the target zone 402 within an enlarged area of the menu item 404 and is at least a part of the selection area of the associated menu item. Optionally, the narrow area 408 may serve as a supplemental zone of the selection area.

As the list extends downward, the target zones 402 of each of the menu items 404 are arranged in a repeating pattern in which the target zones 402 are horizontally offset relative to one another and in which the target zones 402 are positioned away from the ends of the menu items 404. In the example shown in FIG. 4, the target zones 402 are diagonally arranged across three horizontal positions along the menu items 404, extending downward along the touch-sensitive display 118 with respect to the user's viewpoint. The target zones 402 are located in the leftmost position on the "Compose Email" menu item, in the center position on the "Search" menu item, in the rightmost position on the "View Folder" menu item. The pattern repeats with the "Options" menu item, where the target zone 402 is located in the leftmost position, and the pattern continues. By offsetting the target zones 402 in this way, the user has larger areas in which to contact or select an otherwise narrow menu item 404. Offsetting of the target zones 402 relative to nearby menu items further differentiates the menu items 404 from one another and separates selection areas, resulting in a more accurate selection process. As stated above, each of the menu items 404 may be differently colored from nearby menu items to better contrast the menu items 404 from one another.

Shaded target zones 502 for menu items 504 are shown displayed on the touch sensitive display 118 in FIG. 5. Each of the plurality of menu items 504 includes an identifier 506 that is located in a narrow rectangular area that comprises the display area for the menu item 504. A target zone 502 is displayed within the display area for each of the menu items 504. The target zones 502 are arranged in a repeating diagonal pattern in the example in FIG. 5.

The shaded target zone 502 is depicted by an object that is located at least partially within the display area of the corresponding menu item. The object may optionally be displayed next to a menu item in a manner to clearly indicate its association with the corresponding menu item. The object may be circular, such as shown in FIG. 5 through 8, although the object may include stars, squares, triangles, or other shapes. The outer border of the object may be solid, dotted, and/or dashed, and may have different thickness (including borderless) and/or color than the interior of the object and/or the menu item. The interior of the object may be filled, e.g., contain a color, texture, and/or pattern different than the menu item. The object may have a different color arrangement than the rest of the area of the corresponding menu items 504. Color arrangement encompasses various types of coloration, including colors, patterns, shades, color gradients, images, and the like.

To select one of the menu items 504, the user touches the target zone 502 associated with the intended menu item. The selection area is co-located with the target zone 502. The target zones are diagonally arranged, i.e., horizontally distributed relative to the vertical organization of the list, thereby reducing the likelihood of inaccurate selection due to the spatial relationship between adjacent menu items 504.

Figure 6:
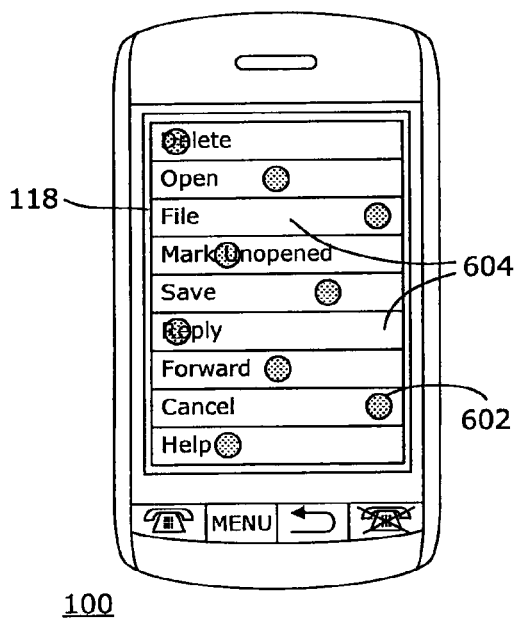

A different embodiment of shaded target zones 602 is illustrated in FIG. 6. The target zones 602 for each of the plurality of menu items 604 are arranged in a more complex repeating pattern that further separates and spaces the target zones 602 from one another.

In this example, the five horizontal positions for the target zones 502 are left, left-center, center, right-center, and right. The target zone 602 for the "Delete" menu item is located in the left position. Moving down the menu, the target zone 602 for the "Open" menu item is located in the center position. Immediately below, the target zone 602 for the "File" menu item is the right position, the target zone 602 for the "Mark Unopened" menu item is the left-center position, and the target zone 602 for the "Save" menu item is the right-center position. The pattern repeats with the "Reply" menu item, where the target zone 602 is in the left position, and the above-described pattern continues.

One benefit of this pattern is the separation of target zones 602 from one another for adjacent menu items. Using this pattern, a target zone 602 in a particular horizontal position is five menu items away from a menu item having the same horizontal position of its target zone, and at least two menu items away from a menu item having an "adjacent" horizontal position of its target zone. This pattern reduces the likelihood of a user unintentionally touching a nearby target zone and provides an aesthetically pleasing pattern of the target zones 602 on the touch-sensitive display 118.

Figure 7:
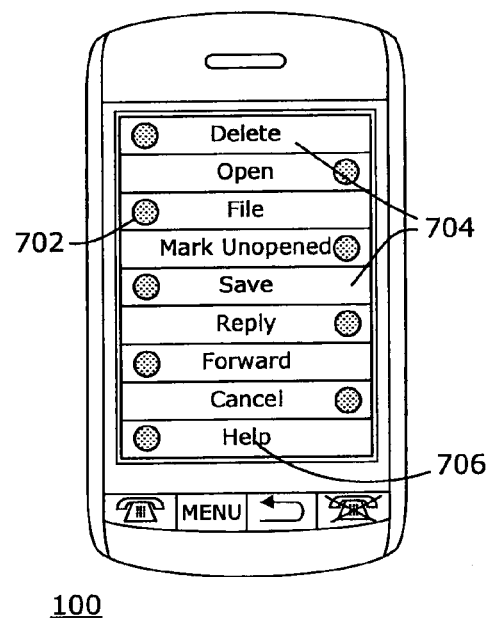

Another embodiment of shaded target zones 702 is illustrated in FIG. 7. In this example, the target zones 702 are alternated on the left and right sides of the menu items 704 on the touch-sensitive display 118. Each of the menu items 704 includes an identifier 706 that is center-justified on the associated menu item 704.

By displaying the staggered pattern of the target zones 702 with the identifiers 706 centered in the display area of the menu items 704, the user may more easily visually identify which of the target zones 702 corresponds to each of the identifiers 706 for the menu items 704, which minimizes the time that the user spends scanning the screen for a target zone for a particular menu item.

A plurality of menu items 804 each having an enlarged, but not visually displayed, selection area 808 surrounding a target zone 802 is shown in FIG. 8. The selection area 808, shown in phantom lines, extends beyond the area displayed for the associated menu item 804 and may, as shown in the example of FIG. 8, overlap at least part of one or more adjacent menu items 804. The amount of overlap, if any, depends on how close the nearby menu items 804 are located. When the touch-sensitive display 118 detects a touch within a selection area 808, the associated menu item 804 for the corresponding target zone 802 to the identified selection area 808 is selected and an appropriate function is performed, as described above. Although a user may touch the selection area 808 in an adjacent menu item 804, a user is presumed to be intending to touch the nearest target zone 802, thereby resulting in a more accurate selection of the intended menu item 804.

Figure 9:
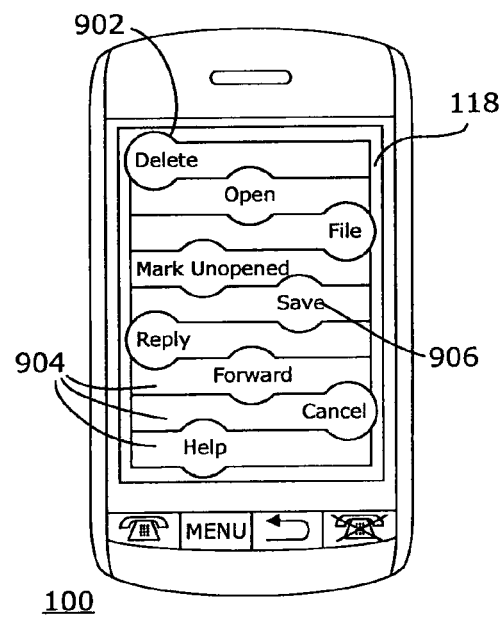
FIG. 9 illustrates enlarged target zones for adjacent menu items having common borders on a touch-sensitive display in accordance with the disclosure.

Enlarged target zones 902 for adjacent menu items 904 having common borders are shown displayed on a touch-sensitive display in FIG. 9. In this example, a plurality of menu items 904 is closely packed together, and each menu item includes an enlarged target zone 902 with an associated identifier 906. At least part of the identifier 906 is placed in the target zone 902, facilitating quick identification by the user of the function associated with each of the menu items 904. The target zones 902 are horizontally offset from one another in a pattern similar to the pattern of the target zones 602 in FIG. 6. The user may more quickly identify the identifier 906 in the larger target zones 902. Adjacent menu items have a common border, as previously described, thereby facilitating efficient use the space on the touch-sensitive display 118.

Patterns other than diagonally-extending patterns and those shown in the drawings and described herein may be utilized to arrange the target zones in a successful way. Other patterns, regular or irregular, random or repeating, may also be used. Horizontal positions may be repeated for different menu items, or may be unique for each menu item displayed. Identifiers for the menu items may be aligned to the left, to the right, or centered, and may be at least partially co-located with the target zone. The target zones for a particular menu or list may be the same or may vary from menu item to menu item. The nature of the target zones, e.g., size, shape, and/or distribution pattern, may be user-selectable. Although the examples provided are shown for a display in portrait orientation, the teachings herein may be easily applied to touch-sensitive display in landscape orientation.

As described herein, menu items with associated target zones improve the accuracy of selection of menu items as well as differentiation the menu items and target zones from one another. In contrast to menus or lists having long and narrow selection areas, the disclosed menu items and target zones are more easily distinguished from one another and are more readily selectable by the touch of a user.

The terms used above, such as vertical, horizontal, left, right, and the like, are relative terms used to provide references to describe the embodiments shown in the figures and are not otherwise limiting.

By advantageously positioning target zones along the menu items, a feature is displayed that differentiates and separates each of the menu items from one another, rendering selection of the intended menu item more likely. The disclosed target zones facilitate the inclusion of many menu items on a single touch-sensitive display without sacrificing the usability of the portable electronic device. When patterns are arranged such that the target zone of each menu item is positioned differently in the horizontal direction from the target zones of the menu item two items above or two menu items vertically with respect to the user's perspective, the alternating horizontal placement facilitates more accurate user selection of menu items than alternating horizontal placement with each adjacent item.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
   displaying, on a touch-sensitive display, a plurality of menu items corresponding to a plurality of target zones, wherein the display of the plurality of menu items includes representations of a target zone distributed among at least three different positions along the menu items, wherein a first target zone associated with a first menu item is positioned away from ends of the first menu item;
   detecting a touch within the first target zone;
   performing at least one function associated with selection of the first menu item.

2. The method of claim 1, wherein at least two adjacent menu items have a common border.

3. The method of claim 1, wherein the first target zone comprises an enlarged area of the first menu item.

4. A method comprising:
   displaying, on a touch-sensitive display, a plurality of menu items corresponding to a plurality of target zones, wherein the display of the plurality of menu items includes representations of a target zone distributed among at least three different positions along the menu items;
   detecting a touch within a first target zone associated with a first menu item;
   performing at least one function associated with selection of the first menu item, wherein the first target zone comprises an enlarged area of the first menu item, wherein the first menu item further includes a supplemental zone that is shorter in at least one dimension than the first target zone, and wherein detecting a touch within the supplemental zone selects the first menu item.

5. The method of claim 4, wherein the supplemental zone and the first target zone are displayed in a single area associated with the first menu item.

6. The method of claim 1, wherein the displayed area for each of the plurality of menu items comprises a first end and a second end, and wherein at least some of the plurality of target zones are located away from the first end and the second end.

7. The method of claim 1, wherein at least a part of an identifier for the first menu item is located within the first target zone.

8. The method of claim 1, wherein the plurality of menu items are listed in a first direction, and the plurality of target zones are arranged along a second direction that is substantially perpendicular to the first direction.

9. The method of claim 8, wherein the plurality of target zones are arranged in a repeating pattern.

10. The method of claim 8, wherein the plurality of target zones extend along a diagonal direction relative to the first direction.

11. The method of claim 8, wherein the plurality of target zones are distributed along at least five different positions along the second direction.

12. The method of claim 1, wherein the first menu item is displayed in a first color arrangement and the first target zone is displayed in a different color arrangement.

13. A method comprising:
displaying, on a touch-sensitive display, a plurality of menu items corresponding to a plurality of target zones, wherein the display of the plurality of menu items includes representations of a target zone distributed among at least three different positions along the menu items;
detecting a touch within a first target zone associated with a first menu item;
performing at least one function associated with selection of the first menu item, wherein the first target zone is visually depicted entirely within a displayed area of the first menu item, and wherein a selection area for the first menu item extends beyond the displayed area of the first menu item.

14. The method of claim 1, wherein performing at least one function comprises displaying information associated with selection of the first menu item.

15. A computer readable medium having stored instructions executed by a processor of a portable electronic device and causing the portable electronic device to implement the method of claim 1.

16. A portable electronic device comprising:
a touch-sensitive display configured to display a plurality of menu items;
a microprocessor configured to:
detect a touch within a selection area of a first menu item of the plurality of menu items, wherein the selection area extends beyond an area displayed for the first menu item;
perform at least one function associated with selection of the first menu item.

17. The portable electronic device of claim 16, wherein the selection area of the first menu item overlaps an area displayed for a second menu item.

18. The portable electronic device of claim 16, wherein the touch is imparted on the touch-sensitive display with a force that exceeds a predetermined threshold.

19. The portable electronic device of claim 16, wherein the at least one function comprises displaying information associated with selection of the first menu item.

20. The portable electronic device of claim 16, wherein at least two adjacent menu items have a common border.

* * * * *